Patented Aug. 15, 1944

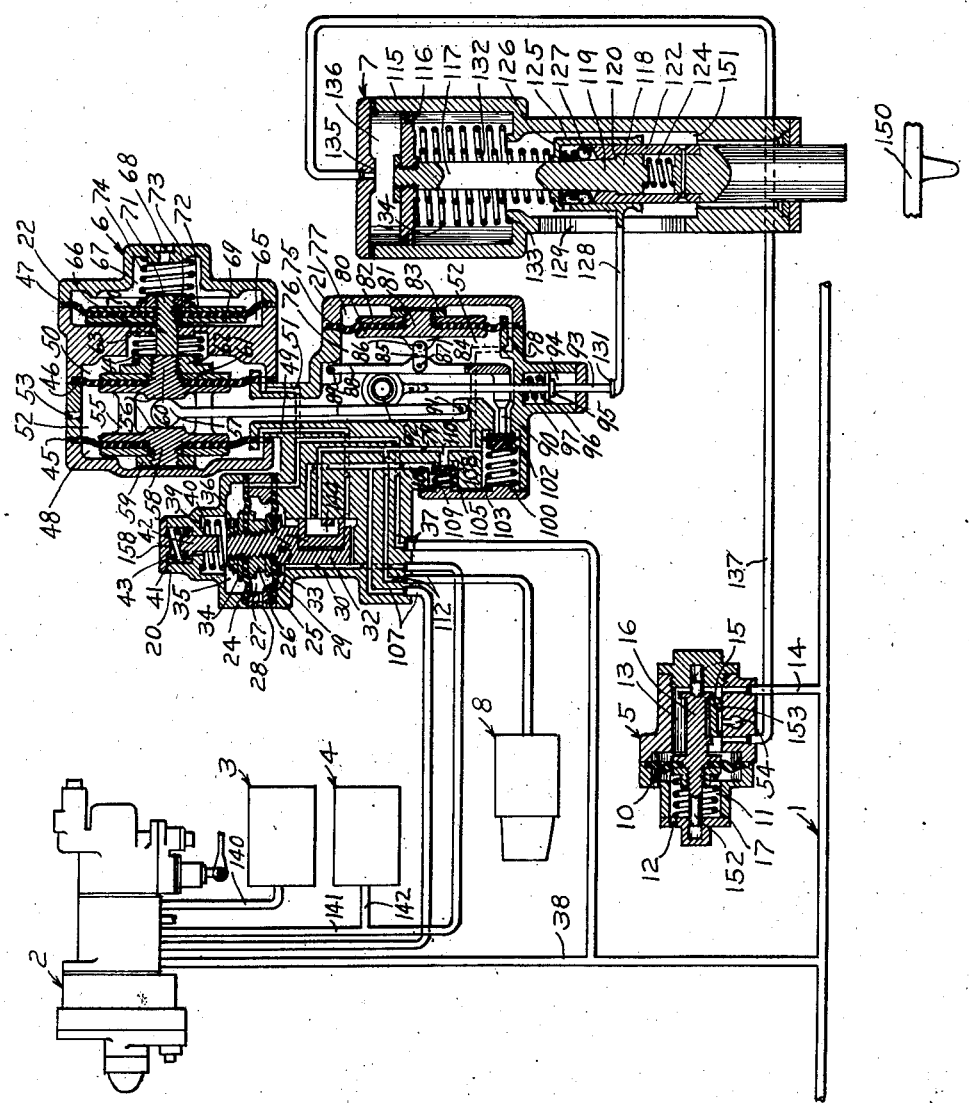

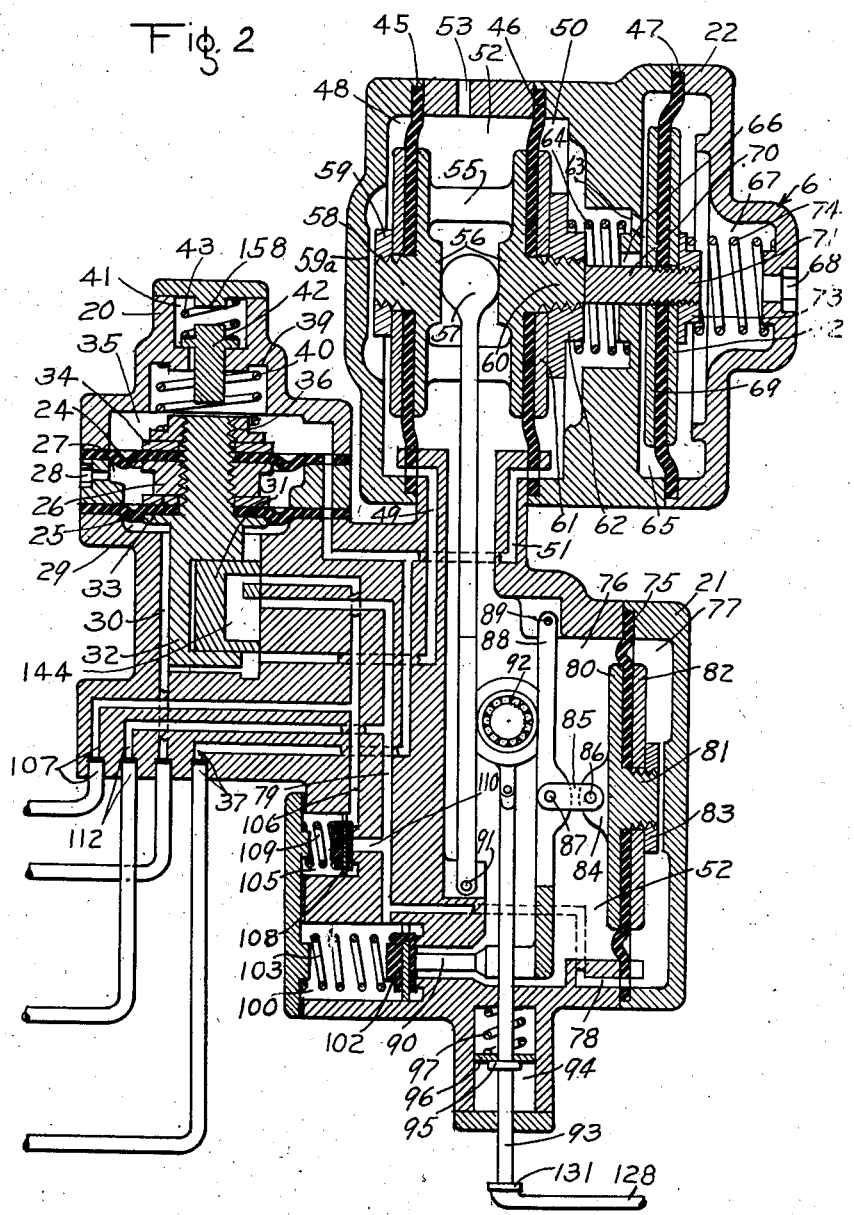

2,355,747

UNITED STATES PATENT OFFICE 2,355,747

VARIABLE LOAD BRAKE

Robert M. Oliver, Reno, Nev., assignor to The Westinghouse Air Brake Company, Wilmerding, Pa., a corporation of Pennsylvania Application December 22, 1942, Serial No. 469,807

20 Claims. (Cl. 303—22)

This invention relates to a variable load fluid pressure brake, in which the braking power is automatically varied according to the load on the vehicle.

The principal object of the invention is to provide an improved variable load brake apparatus of the above mentioned type.

Another object of the invention is to provide a novel vehicle variable load brake apparatus which will operate to hold the braking ratio substantially constant for any weight carried by the vehicle.

Another object of the invention is to provide a novel vehicle variable load mechanism which may be used in conjunction with a standard air brake equipment for the purpose of controlling the brake cylinder pressure in accordance with the brake pipe reduction and the weight carried by the vehicle.

Still another object of the invention is to provide a novel strut mechanism for use in conjunction with a variable load mechanism.

Other objects and advantages will appear in the following detailed description of the invention.

In the accompanying drawings Fig. 1 is a diagrammatic view, partly in section, of a variable load brake apparatus constructed in accordance with the invention; and Fig. 2 is an enlarged view of a portion of the apparatus shown in Fig. 1.

As shown in the accompanying drawings, the variable load fluid pressure brake apparatus may comprise a brake pipe 1, a brake controlling valve device 2, an auxiliary reservoir 3, an emergency reservoir 4, a change over control valve device 5, a variable load valve device 6, a strut cylinder mechanism 7 and a brake cylinder 8.

The brake controlling valve device 2 shown is of the "AB" type but may be of any other desired type. This controlling valve device may be of substantially the same construction as the "AB" valve device fully described in the patent to Clyde C. Farmer No. 2,031,213, issued February 18, 1936, and in view of this it is deemed unnecessary to show and describe the device in detail. It will of course be understood that this mechanism operates upon a service reduction in brake pipe pressure to supply fluid under pressure from the auxiliary reservoir to the brake cylinder to effect a service application of the brakes, upon an emergency reduction in brake pipe pressure to supply fluid under pressure from both the auxiliary and emergency reservoirs to the brake cylinder to effect an emergency application of the brakes and upon an increase in brake pipe pressure to effect a release of the brakes and the charging of the brake equipment.

The changeover control valve device 5 may comprise a two piece casing having clamped therebetween a flexible diaphragm 10. At one side of this diaphragm there is a chamber 11 which is constantly connected through a passage 12 with the atmosphere. At the opposite side of the diaphragm there is a valve chamber 13 which is constantly connected through a passage and pipe 14 to the brake pipe 1.

Contained in valve chamber 13 is a slide valve 15 which is adapted to be operated by a stem 16 operatively connected to the diaphragm 10 in any suitable manner. Contained in chamber 11 is a spring 17 which, at all times, tends to urge the diaphragm 10, stem 16 and slide valve 15 toward the position in which they are shown in the drawings.

The variable load valve device 6 comprises a casing structure which is rigidly secured in any suitable manner to a sprung part of the vehicle, such for instance, as the vehicle body. As illustrated, the casing structure comprises a brake cylinder cut off valve portion 20, a limiting portion 21 and a pressure reduction responsive portion 22.

The brake cylinder cut-off valve portion 20 is provided with a pair of spaced flexible diaphragms 24 and 25, having interposed therebetween a diaphragm follower 26 adapted to cooperate with both diaphragms. The area of diaphragm 24 is greater than that of diaphragm 25. The follower 26 is contained in a chamber 27 which is in constant open communication with the atmosphere by way of a passage 28.

At the lower side of the diaphragm 25 there is a valve chamber 29 which is in constant open communication with a passage and pipe 30 leading to the brake controlling valve device 2. Contained in valve chamber 29 is a slide valve 31 which is operatively connected to a stem 32 which stem is provided with a collar 33 adapted to engage one face of the diaphragm 25.

The diaphragms 24 and 25 and the follower 26 are clamped between the collar 33 and a diaphragm follower 34, contained in a chamber 35 at the upper face of diaphragm 24, by means of a nut 36 having screw-threaded connection with the upper end of the stem 32, which passes through diaphragm 25, follower 26, diaphragm 24 and follower 34. The chamber 35 is connected to the brake pipe 1 by way of a passage and pipe 37 and a connected pipe 38.

Contained in chamber 35 and interposed between and operatively engaging the diaphragm follower 34 and a shoulder 39 formed in the casing is a spring 40, which spring, at all times, tends to urge the diaphragms and associated followers, stem 32 and slide valve 31 to the position shown in the drawings.

Contained in a chamber 41 there is a movable stop member 42 which is subject to the pressure of a coil spring 43 and which is adapted to be engaged by the upper end of the stem 32.

The pressure reduction responsive portion 22 comprises a casing in which there is mounted spaced flexible diaphragms 45, 46, and 47. At one side of the flexible diaphragm 45 there is a chamber 48 which is connected by way of a passage 49 to the valve chamber 29 in the brake cylinder cut-off portion 20.

At one side of flexible diaphragm 46 there is a chamber 50 which is in constant open communication with the passage 37 by way of a connected passage 51. Intermediate the diaphragm 45 and 46 there is a chamber 52 which is in constant open communication with the atmosphere by way of a passage 53.

Disposed in chamber 52 and engaging the diaphragms 45 and 46 is a hollow circular spacing diaphragm follower 55 having interior axially arranged spaced bosses 56 for engagement with the enlarged circular end of a lever arm 57, the follower having an opening of suitable size to permit the circular end of the arm to be inserted and properly positioned in the follower. One end of the follower 55 is provided with a stud portion 58 which extends through the diaphragm 45 into chamber 48. A diaphragm follower plate is applied over the stud 58 and is secured in position in engagement with the diaphragm 45 by means of a nut 59 having screw threaded engagement on said stud.

The opposite end of the diaphragm follower 55 is provided with a stud portion 60 extending through the diaphragm 46 into chamber 50. A diaphragm follower plate 61 is applied over stud 60 and is secured in position in engagement with the diaphragm 46 by means of a nut 62 having screw threaded engagement on said stud.

Contained in chamber 50 and interposed between and operatively engaging the follower plate 61 and a shoulder 63 formed in the casing is a spring 64 which tends, at all times, to urge the diaphragm assembly to the position shown in the drawings.

At one side of the diaphragm 47 there is a chamber 65 which is in constant open communication with chamber 50 by way of a passage 66. At the opposite side of diaphragm 47 there is a chamber 67 which is in constant open communication with the atmosphere by way of a passage 68.

Contained in chamber 65 and engaging one face of diaphragm 47 is a diaphragm follower 69 having a stem 70 which extends into chamber 50 and is spaced away from the end of the stud portion 60. The follower 69 is also provided with a stud portion 71 which extends through diaphragm 47 into chamber 67. A diaphragm follower plate 72 is applied over the stud 71 and is secured in position in engagement with the diaphragm 47 by means of a nut 73 having screw threaded engagement with the stud.

Contained in chamber 67 and interposed between and operatively engaging the follower plate 72 and an end wall of the casing is a spring 74 which, at all times, tends to urge the diaphragm 47 and its associated followers to the position shown in the drawings.

The limiting portion 21 comprises a casing in which there is mounted a flexible diaphragm 75 having at one side a chamber 76 which is in constant open communication with atmosphere chamber 52. At the opposite side of this diaphragm there is a chamber 77 which is connected to a passage 78 which passage in turn is connected to a passage 79 leading to the seat for the slide valve 31 in the brake cylinder cut-off valve portion 20.

Contained in chamber 76 and engaging one face of diaphragm 75 is a diaphragm follower 80 having a stud portion 81 which passes through diaphragm 75 into chamber 77. A follower plate 82 is applied over the stud 81 to the opposite side of diaphragm 75 and is secured in position by means of a nut 83 having screw threaded engagement with the stud.

The diaphragm follower 80 is also provided with an annular boss 84 to which one end of a link member 85 is connected by means of a pin 86. The opposite end of the link member 85 is connected by means of a pin 87 to a lever 88 at a point intermediate its ends which lever is disposed in chamber 76.

The lever 88 is pivotally connected at one end to the casing by means of a pin 89 and at its opposite end is provided with a projection 90 which extends at right angles to the main portion of the lever.

The lever arm 57 hereinbefore mentioned extends into chamber 76 and is pivotally connected at the opposite end to the casing by means of a pin 91.

Interposed between and operatively engaging lever arm 57 and lever 88 is a variable fulcrum roller 92 which is carried at one end of a rod 93. The opposite end of the rod 93 extends through a suitable opening in the projection 90 and through a bore 94 formed in the casing to the exterior of the casing.

Within the bore 94 the rod 93 is provided with a shoulder 95 which serves as a stop for a spring seat 96 which is slidably mounted in said bore. Interposed between the spring seat 96 and the casing there is a spring 97 which acts, at all times, to resist inward movement of the rod and thereby the roller.

The limiting portion 21 is also provided with a chamber 100 which is connected to passage 79. Contained in chamber 100 is a valve 102 which is normally urged to its seated position under the pressure of a coil spring 103. This valve controls communication between chambers 100 and 76 and is adapted to be unseated by the projection 90 carried by the lever 88.

Also contained in the casing is a chamber 105 which is connected to a passage 106 leading to the seat for slide valve 31. The passage 106 in turn is connected by way of a passage and pipe 107 leading to the brake controlling valve device 2.

Contained in chamber 105 is a release check valve 108 which is normally urged to its seated position under the pressure of a coil spring 109 and is employed to control communication between chambers 105 and a passage 110 which passage is in open communication with passage 79. The passage 79 is connected to the brake cylinder 8 by way of a connected passage and pipe 112.

The strut cylinder mechanism 7 comprises a tubular body portion 115 which is rigidly connected to a sprung portion of the vehicle such as the truck bolster. In the body casing 115 there is operatively mounted a piston 116 having a piston stem or rod 117. This stem or rod is provided with an enlarged lower end portion 118, a downwardly and outwardly tapering section 119 merging into the upper end of the enlarged portion, the enlarged portion at the point of such merging providing a shoulder 120, as illustrated in the drawings.

The enlarged lower end portion 118 of the piston stem or rod 117 is slidably mounted in the upper sleeve like end of a strut 122, which strut is axially disposed with relation to the piston stem and is slidably mounted for vertical movement in the casing.

Interposed between and operatively engaging the enlarged portion 118 and the strut is a spring 124 which normally maintains the strut spaced away from the lower end of the piston stem, there being a shoulder formed on the upper sleeve like portion of the strut which engages the shoulder 120 on the stem so as to maintain the strut connected to the piston stem.

Slidably mounted on the sleeve like portion of the strut is a sleeve member 125 having an upper wall 126 which is provided with an opening through which the piston stem 117 extends thus providing for relative movement between the member and piston stem. This upper wall 126 is spaced away from the upper end of the sleeve like portion of the strut 122, and contained in this space are a plurality of locking elements in the form of balls 127 which are adapted to engage the inner surface of the sleeve member 125 and the tapering surface of section 119 of the piston stem.

The sleeve member 125 is provided with a horizontally extending arm 128 which passes through a suitable slotted opening 129 in the body casing 115 and at its end is provided with a foot 131 which is adapted to engage the outer end of rod 93 of the variable load valve device.

Surrounding piston stem or rod 117 and interposed between and operatively engaging the lower side of the piston 116 and the upper wall 126 of the sleeve member 125 is a spring 132 which spring tends, at all times, to urge the sleeve member in a direction away from the piston.

Surrounding the spring 132 and interposed between and operatively engaging the lower side of the piston 116 and a spring seat 133 provided in the casing is a spring 134 which tends, at all times, to urge the piston into engagement with a stop 135 provided on the inner top wall of the casing.

At the upper face of piston 116 there is a chamber 136 which is in constant open communication with a pipe 137 leading to the change over control valve device 5.

OPERATION

Initial charging of the equipment

Assuming the brakes on the vehicle to be released and the brake pipe of the vehicle deplete of fluid under pressure. Under these conditions the brakes controlling valve device 2 will be in release position and the several other parts of the equipment will all be in the position illustrated in the drawings except the piston 116 of the strut mechanism 7 which will be in a position in which it engages the stop 135.

In initially charging the brake system under the above conditions fluid under pressure is supplied to the brake pipe 1 in the usual manner. Fluid under pressure supplied to the brake pipe 1 flows through pipe 38 to the several chambers of the brake controlling valve device 2 which are to be charged and from the brake controlling valve device, flows in the usual manner, to a pipe 140 and a pipe 141. Fluid under pressure thus supplied to pipe 140 flows to the auxiliary reservoir 3, and fluid under pressure supplied to pipe 141 flows by way of a connected pipe 142 to the emergency reservoir 4.

Fluid under pressure supplied to pipe 141 also flows by way of connected passage 30 to chamber 29 in the brake cylinder cut-off valve portion 20 of the variable load valve device 6. Fluid under pressure thus supplied to chamber 29 flows by way of connected passage 49 to chamber 48 in the reduction limiting portion 22. Fluid under pressure also flows from pipe 38 to pipe and passage 37 from whence it flows to chamber 35 in the brake cylinder cut-off valve portion 20. Fluid under pressure thus supplied to passage 37 also flows by way of connected passage 51 to connected chambers 50 and 65 in the reduction limiting portion 22.

Since areas of the diaphragms 45 and 46 in the reduction limiting portion 22 of the variable load valve device 6 are substantially equal and the pressure of fluid acting in chambers 48 and 50 is substantially the same, the spring 63 will act to hold the diaphragm assembly in the position in which it is shown in the drawings, i. e., in engagement with a stop 59a provided on the casing. Fluid under pressure supplied to chamber 65 causes the diaphragm 47 and associated followers to move in the direction toward the right-hand against the opposing pressure of spring 74, until brought to a stop by the diaphragm follower plate 72 engaging a stop on the casing. It should here be understood that the diaphragm 47 and associated followers will be maintained in this position so long as the brake pipe pressure acting in chamber 65 is not reduced below the opposing pressure of the spring 74 which in the present instance is approximately 40 pounds.

With chambers 35 and 29 charged with fluid at substantially the same pressure, the pressure of spring 40 plus the pressure of fluid acting over the diaphragm 24 of large area in opposition to the pressure acting over the smaller diaphragm 25 will maintain the diaphragm and associated parts in the position shown.

With the brake controlling valve device in its release position the pipe and passage 107 is connected through the brake controlling valve device, in the usual manner, to the atmosphere. With the passage 107 thus connected to the atmosphere brake cylinder 8 is connected to the atmosphere by way of pipe and passage 112, connected passage 79, a cavity 144 in the slide valve 31 of the brake cylinder cut-off valve portion 20 which is adapted, in the position shown, to connect passage 79 to passage 106 and thereby to passage 107. Since passage 79 is connected to the atmosphere through the circuit just traced, connected chamber 100 at one side of valve 102 is also connected to the atmosphere, and since chamber 76 at the opposite side of valve 102 is maintained connected to the atmosphere as previously described, spring 103 maintains the valve 102 in seating engagement with its seat as shown.

As hereinbefore mentioned chamber 77 in the limiting portion of the variable load valve device 6 is connected by way of passage 78 to passage 79, so that this chamber is also connected to the atmosphere. Since passage 110 is in constant open communication with passage 79 and chamber 105 is in constant open communication with passage 106, both sides of the check valve 108 are at atmospheric pressure and spring 109 maintains the valve in its seated position as shown.

Fluid under pressure supplied to brake pipe 1 also flows to slide valve chamber 13 in the change over control valve device 5 by way of connected pipe 14, the spring 17 maintaining the diaphragm 10 and attached slide valve 15 in the position shown until a predetermined pressure has been built up in the valve chamber for a reason presently described.

Fluid under pressure thus supplied to valve chamber 13 flows to chamber 136 in the strut mechanism 7 by way of a pipe 137 causing the piston 116, and attached stem 117 to move downwardly in opposition to the pressure of springs 132 and 134.

Since at this time the sleeve member 125 is maintained locked to the stem 117 by means of the tapered section 119, on the stem and the balls 127, in the manner hereinafter described, the sleeve membr 125 is also caused to move downwardly with the piston stem. As hereinbefore described the strut 122 is connected to the stem 117 and downward movement of the stem transmitted through spring 124 causes the strut 122 to move in the same direction.

As hereinbefore mentioned the strut mechanism 7 is mounted on a sprung portion of the vehicle such as the truck bolster and from this it will be understood by those skilled in the art that as the load carried by the truck increases, the usual truck springs (not shown) will be compressed so that the truck bolster (not shown) and the strut mechanism 7 carried thereby will move downwardly relative to the usual truck spring plank (not shown). This movement will always be proportional to the degree of the load, starting from empty and progressing to a maximum point at full load.

From the foregoing it will be understood that as the load on the vehicle is increased the clearance or distance between the outer end of the strut 122 and a stop member 150 carried on an unsprung part of the vehicle truck, such as the truck spring plank, will be reduced.

Now the piston 116, stem 117 and strut 122 continues to move downwardly under the influence of fluid under pressure supplied to chamber 136 until the end of the strut 122 engages the stop 150. When this occurs continued movement of piston 116 and stem 117 compresses spring 124 and permits stem 117 to move downwardly relative to the strut. Upon such relative movement the upper end of the sleeve like portion of the strut engages the balls 127 causing the balls to move upwardly along the inwardly tapering section 119 of the stem, thus disengaging the balls 127 from between the tapering section of the stem and the sleeve member 125. Just as soon as the balls 127 are disengaged from the sleeve member 125, the pressure of spring 132, which has been compressed by previous relative movement between the piston and the member, causes the member to move downwardly relative to the stem until the lower end thereof engages an annular stop shoulder 151 formed within the body casing 115. If the lower end of the sleeve member 125 engages shoulder 151, in the manner just described, before the piston 116 and stem 117 have completed their travel, the balls 127 being out of locking position will permit the free movement of the piston and stem relative to the sleeve member.

Now when the pressure of fluid in valve chamber 13 of the change over control valve device 5 has been increased to around 40 pounds, the diaphragm 10 will be caused to deflect in a direction toward the left-hand against the opposing pressure of spring 17. The diaphragm as it is thus deflected acts through the medium of the stem 17 to shift the slide valve 15 in the same direction. When the deflection of the diaphragm is brought to a stop by means of an extension 152, carried by the stem 16, engaging the inner wall of the casing, the slide valve 15 will have been moved into a position in which a cavity 153 therein connects the pipe 137 to an atmospheric passage 154. With this communication established fluid under pressure in chamber 136 of the strut mechanism 7 is quickly vented to the atmosphere, by way of pipe 137, cavity 153 in the slide valve 15 of the change over control valve device 5 and atmospheric passage 154.

Upon a reduction of pressure in chamber 136, spring 134 acting on the opposite side of the piston 116 causes the piston and stem 117 to move upwardly, while the spring 132 acts to maintain the sleeve member 125 against upward movement at this time, so that the stem 117 moves relative to sleeve member 125. As the piston and stem continue to move in this direction relative to the sleeve member 125, the balls 127 by reason of the downwardly and outwardly tapering section 119 of the stem are forced into locking engagement with the inner wall of the sleeve member 125. When this occurs continued movement of the piston 116 and stem 117 causes the sleeve member 125 to move in the same direction. Initial movement of the piston and stem in an upwardly direction permits the spring 124 to expand and, as the piston and stem continue to move in the same direction, the shoulder 120 on the stem is brought into engagement with the shoulder on the upper sleeve like portion of the strut 122. Now continued movement of the piston and stem in an upwardly direction causes the sleeve member 125 and strut 122 to move in the same direction until the piston is brought to a stop by engagement with the stop 135, in which position it will be maintained by spring 134.

It will here be noted that the horizontally disposed arm 128 is moved with the sleeve member 125 so as to vary the position of the fulcrum roller 92. Therefore, since the sleeve member 125 is positioned in accordance with the load carried by the vehicle in the manner just described, the fulcrum roller 92 will also be positioned accordingly. The spring 134 in the strut mechanism 7 acts to maintain the piston and thereby the sleeve member 125 and arm 128 in their adjusted position, and the spring 97 acts to maintain the fulcrum roller positioning rod in engagement with the arm 128.

Application of brakes

When the brake pipe pressure is reduced to effect an application of the brakes, the brake controlling valve device 2 functions in the usual well known manner to supply fluid under pressure from the auxiliary reservoir 3 to the brake cylinder 8 in order to advance the brake shoes into frictional engagement with the vehicle wheels. The flow of fluid under pressure from the auxiliary reservoir to the brake cylinder is by way of pipe 140, through brake controlling valve device 2, pipe and passage 107, passage 106, cavity 144 in slide valve 31 of the brake cylinder cut off valve portion 20, passage 79 and connected passage and pipe 112.

Fluid under pressure thus supplied to passage 79 also flows to chamber 100 and acts with the spring 103 to maintain valve 102 seated. Fluid under pressure supplied to passage 79 also flows to connected passage 110. From passage 106 fluid flows to chamber 105. With fluid under pressure at the same pressure acting in chamber 105 and passage 110 at opposite sides of the valve 108, the spring 109 maintains the valve seated.

Fluid under pressure supplied to passage 79 also flows through connected passage 78 to chamber 77 in the limiting portion 21. As the pressure thus supplied to chamber 77 and acting on diaphragm 75 increases it acts through the medium of the diaphragm 75 connected diaphragm followers 80 and 82, link 85 and lever arm 88 which fulcrums on fulcrum roller 92, to exert a force which acts through the projection 90 carried by the arm 88 on valve 102, which force tends to unseat the valve. It should here be mentioned that the pressure of spring 103 plus the brake cylinder pressure present in chamber 100 is sufficient to hold the valve 102 seated against a brake cylinder pressure, of approximately 15 pounds, acting in diaphragm chamber 77 of the limiting portion 21. It should also be understood that when the brake cylinder pressure and consequently the pressure in diaphragm chamber 77 has been increased to approximately 15 pounds the diaphragm assemblage, including diaphragms 45 and 46 and connected diaphragm follower 55, will have moved in a direction toward the right-hand against the opposing force of the spring 64, due to the reduction in brake pipe pressure in chamber 50. Movement of the diaphragm assemblage in this direction will cause the arm 57 to rock about the pin 91 in a clockwise direction and move into engagement with the fulcrum roller 92. Upon movement of the arm 57 into engagement with the roller 92 an additional force proportionate to the reduction in brake pipe will act to aid the spring 103 and brake cylinder pressure in chamber 100 to prevent the brake cylinder pressure acting in diaphragm chamber 77 to unseat the valve 102 all of which will be more fully described in the following description of the operation of the equipment.

As brake pipe pressure is reduced to effect an application of the brakes, the fluid under pressure in connected chambers 50 and 65 of the pressure reduction responsive portion 22 and in chamber 35 of the brake cylinder cut-off portion 20, in the variable load valve device 6 is correspondingly reduced. The commuication from connected chambers 50 and 65 in the reduction limiting portion 22 to the brake pipe 1 is by way of passage 51, passage and pipe 37 and pipe 38, and from chamber 35 in the brake cylinder cut-off valve portion 20 is by way of connected passage and pipe 37 and pipe 38.

As the fluid under pressure in connected chambers 50 and 65 is thus reduced, the fluid under pressure, at emergency reservoir pressure, in chamber 48 and acting on diaphragm 45 in opposition to the reduced brake pipe pressure and pressure of spring 64 acting on diaphragm 46, tends to move the diaphragms 45 and 46 and connected diaphragm follower 55 in a direction toward the right-hand, but spring 64 exerts sufficient pressure to withhold such movement of the diaphragm and diaphragm follower 55 until the brake pipe pressure has been reduced to a degree sufficient to establish the aforementioned pressure of 15 pounds in the brake cylinder 8. As hereinbefore mentioned the diaphragm 47 and associated followers are maintained in a position opposite to that shown so long as the brake pipe pressure in chamber 65 is not reduced below the opposing pressure of spring 74. As a result the diaphragm 47 and associated followers will remain inoperative during a service application of the brakes for the reason that during a full service application, the brake pipe pressure is not reduced below 50 pounds.

As the brake pipe pressure and consequently the pressure in chambers 50 and 65 continues to reduce the diaphragm assemblage including diaphragms 45 and 46 and connected diaphragm follower 55, moves in a direction toward the right-hand. Movement of the diaphragm follower 55 in this direction causes the arm 57 to rock about pin 91 in a clockwise direction and exert a force proportionate to the reduction in brake pipe pressure, against the fulcrum roller 92, in opposition to the force exerted through the medium of lever arm 88. It will here be understood that if the pressure in the brake cylinder 8 and consequently in chamber 77 is increased to a degree sufficient to overcome the opposing force exerted by the arm 57, which opposing force is determined by the reduction in brake pipe pressure, the arm 88 will rock in a clockwise direction on fulcrum roller 92 and through the medium of extension 90 unseat valve 102. With valve 102 unseated fluid under pressure will be vented from the brake cylinder 8 to the atmosphere by way of pipe and passage 112, passage 79, chamber 100, past unseated valve 102, chamber 52 and atmospheric passage 53. At the same time fluid at brake cylinder pressure acting in chamber 77 of the limiting portion 21 of the variable load valve device 6 will be vented to the atmosphere by way of passage 78, passage 79, chamber 100, past unseated valve 102, chamber 52 and atmospheric passage 53. This reduction in pressure in the brake cylinder 8 and in chamber 77 of the limiting portion 20 will continue until such time as the force transmitted through arm 57 is sufficient to overcome the force exerted by arm 88. When this occurs, the spring 103 will again force the valve 102 into seating engagement with its seat and thereby cut off the flow of fluid under pressure from the brake cylinder 8 and the chamber 77 to the atmosphere.

From the foregoing description it will be seen that the brake cylinder pressure is limited by the brake pipe reduction acting through proportioning linkage to the brake cylinder pressure limiting diaphragm, the proportioning being determined by the position of the adjustable fulcrum roller 92.

It should here be understood that the cut-off valve 20 is inoperative to perform any function until the brake pipe pressure acting in chamber 35 has been reduced a predetermined amount such as 20 pounds as determined by the differential area of diaphragms 24 and 25.

When the reducing brake pipe pressure acting in chamber 35 of the brake cylinder cut off portion 20 reaches normal equalization pressure i. e., 50 pounds as determined by the difference in area between diaphragms 24 and 25 and spring 40, the emergency reservoir pressure acting in chamber 29 causes the diaphragms 24 and 25 and connected diaphragm follower 26 to move against the opposing pressure of spring 40 into engagement with the end of the plunger 42 where it is held against further movement in the same direction by means of spring 43.

With the diaphragms 24 and 25 and follower 26 thus positioned the slide valve 31 will have been moved to a position in which passage 106 is cut off from passage 79, so that further flow of fluid under pressure to the brake cylinder is cut off, thus interrupting any further development of brake cylinder pressure.

*Release after a service application of the brakes*

When it is desired to effect a release of the brakes the brake pipe pressure is increased in the usual manner, causing the brake controlling valve device 2 to establish communication from pipe 107 to the atmosphere. The control valve device also functions to supply fluid under pressure from the brake pipe 1 to the auxiliary and emergency reservoirs 3 and 4, respectively.

As a result of the increase in the pressure of fluid in the brake pipe, the pressure of fluid acting in chamber 35 of the brake cylinder cut off valve portion 20 and chambers 50 and 65 of the pressure reduction responsive portion 22 of the variable load valve device 6 is increased. The flow of fluid under pressure from the brake pipe to said chambers is by way of the communications hereinbefore traced in connection with initial charging. When the increase in the pressure of fluid in chamber 35 acting together with the pressure of spring 40 on diaphragm 24 has been increased to a degree sufficient to overcome the opposing force of the fluid at emergency reservoir pressure in chamber 29 and acting on diaphragm 25, the operating parts of the brake cylinder cut off valve portion 20 will be moved to the position in which they are shown in the drawings. With the slide valve 31 of the brake cylinder cut off valve portion 20 thus positioned, communication is again established between passages 79, 106, and 107 so that fluid under pressure in the brake cylinder is vented to the atmosphere to effect a release of the brakes. The communication from the brake cylinder to the atmosphere is by way of pipe and passage 112, passage 79, cavity 144 in the slide valve 31, passage 106, passage and pipe 107 and through the brake controlling valve device 2. At the same time, fluid under pressure in chamber 77 of the limiting portion 21 of the variable load valve device 6 is reduced by way of passage 78 and connected passage 79 thus relieving the force exerted on valve 102 through the medium of the diaphragm 75, associated followers 80 and 82, link arm 85, lever arm 88 and projection 90, so that the spring 103 maintains the valve 102 seated.

As the pressure of fluid in chamber 50 of the pressure reduction responsive portion 22 is increased as a result of the increase in brake pipe pressure, this pressure together with the pressure of spring 63 acting on diaphragm 46 causes the diaphragm pile including diaphragms 45 and 46 and diaphragm follower 55 to move in a direction toward the left-hand, to the position in which it is shown in the drawings, against the opposing pressure of emergency reservoir fluid in chamber 48, acting on diaphragm 45. The diaphragm pile as it moves in this direction acts through the medium of lever 57 to relieve the force exerted on the fulcrum roller 92, so that all parts of the equipment is again conditioned for another application of the brakes.

*Emergency application of the brakes*

With the equipment charged with fluid under pressure and the fulcrum roller 92 positioned in accordance with the load carried by the vehicle through the medium of the strut mechanism 7, in the manner previously described in connection with initial charging of the equipment, and it is desired to effect an emergency application of the brakes, the brake pipe pressure is vented to the atmosphere in a manner which is well known to those skilled in the art.

It will be understood from the previous description of a service application of the brakes that a reduction in brake pipe pressure will result in a corresponding reduction in the pressure of fluid in chamber 35 of the brake cylinder cut off portion 20 and in chambers 50 and 65 of the pressure reduction responsive portion 22 of the variable load valve device 6. The reduction in pressure in chamber 35 due to the emergency reduction in brake pipe pressure, will permit the emergency reservoir pressure in chamber 29 and acting on diaphragm 25 to move the diaphragm assemblage and connected slide valve 31 to their emergency position. Upon movement of said diaphragm assemblage to this position, the assembly is first moved against the opposing pressure of spring 40 into engagement with the movable stop member 42 and continued movement of the diaphragm assembly causes the stop member to move against the opposing pressure of spring 43 into engagement with a fixed stop 158 provided on the casing. With the diaphragm assembly and slide valve 31, in the brake cylinder cut off valve portion 20 of the variable load valve device 6 in emergency position, the cavity 144 in the slide valve establishes communication between passages 106 and 79.

The emergency reduction in pressure in chamber 50 of the reduction insuring portion 22 permits the emergency reservoir pressure acting in diaphragm chamber 48 to move the diaphragms 45 and 46 and connected follower 55 in a direction toward the right-hand against the opposing pressure of spring 64, causing the arm 57 to exert force against the fulcrum roller 92 in the same manner as hereinbefore described in connection with a service application of the brakes. It will be noted that when an emergency application of the brakes is effected, the brake pipe and thereby the chambers 50 and 65 are vented to the atmosphere and as a result there is no pressure in chamber 50 to assist spring 64 in opposing movement of the diaphragm assemblage.

The reduction in pressure in chamber 65 due to the emergency reduction in brake pipe pressure permits the spring 74 to flex the diaphragm 47 in a direction toward the left-hand. This flexing of the diaphragm 47 causes the associated diaphragm follower 69 and stem 70 to move in the same direction until the end of the stem 70 is brought into engagement with the diaphragm pile which comprises the diaphragms 45 and 46 and connected follower 55. With the diaphragm pile thus engaging the end of the stem 70, as shown the spring 74 acts, through the medium of the diaphragm pile and arm 57, to assist spring 64 in opposing movement of the diaphragm pile in a direction toward the right-hand thus producing a definite limited pressure against the fulcrum roller 92 which acts to oppose the force exerted by lever 88 to unseat valve 102. It will be understood by those skilled in the fluid pressure brake art that when a brake controlling valve device 2 of the "AB" type is employed and an emergency application of the brakes is effected, the emergency reservoir pressure and thereby the pressure in chamber 48 is reduced to approximately 60 pounds.

At the same time, the emergency reduction in brake pipe pressure causes the brake controlling valve device 2 to supply fluid under pressure from both the auxiliary and emergency reservoirs 3 and 4, respectively, to the brake cylinder 8 to move the brake shoes into frictional engagement with the wheels and effect an emergency application of the brakes. The communication through which fluid under pressure is supplied from both reservoirs to the brake cylinder 8 is through pipe 107 and from thence the same circuit is hereinbefore traced in connection with a service application of the brakes.

It will be understood from the foregoing description of a service application of the brakes that fluid under pressure supplied to the brake cylinder 8 will also flow to chamber 77 in the limiting portion 21 of the variable load valve device 6 and that such pressure acting on diaphragm 75 causes a force proportionate to the brake cylinder pressure to be exerted through the medium of the associated followers, link 85 and lever 88 to unseat the valve 102, however, since the force exerted by the brake cylinder pressure through the medium of arm 88 is opposed by a definite force exerted through the medium of arm 57, the projection 90 on the arm 88 will not be caused to operate to unseat the valve 102, unless the force exerted by the brake cylinder pressure through the medium of arm 88 exceeds the force exerted by arm 57. Therefore the pressure in brake cylinder 8 will build up to a degree in accordance with the position of the fulcrum roller 92 as determined by the load on the vehicle.

*Release after an emergency application*

In effecting a release of the brakes after an emergency application of the brakes the brake pipe pressure is increased in the usual manner and the brake controlling valve device 2 functions in the same manner as described in releasing after a service application of the brakes to release fluid under pressure from the brake cylinder 8 and chamber 77 in the limiting portion 21 of the variable load valve device 6. At the same time the increase in brake pipe pressure results in recharging the chambers 35 and 29 of the brake cylinder cut off valve portion 20 and chambers 48, 50, and 65 of the reduction limiting portion 22 of the variable load valve described in the same manner as previously described in connection with initial charging of the equipment, so that the operating parts again assume the position in which they are shown in the drawings.

It should here be noted that since diaphragm 47 is of larger area than diaphragm 46 the increase in pressure in chamber 50 acting together with the pressure spring 63 causes the diaphragms 45 and 46 and follower 55 to move to the position shown before the increase in pressure in chamber 65 and acting on diaphragm 47 overcomes the opposing force of spring 74. It should also be noted that the increase in pressure in chamber 50 will be at a slower rate than the reduction in pressure in chamber 77, therefore the force exerted through the medium of the arm 57 will act to prevent operation of the arm 88 to unseat the valve 102 in effecting a release of the brakes.

The release check valve 108 is provided to allow brake cylinder pressure to flow from the brake cylinder 8 to the brake controlling valve device 2 when effecting a release of the brakes, in the event that the slide valve 31 of the brake cylinder cut off valve portion 20 is, for any reason, maintained in the position in which communication between passages 106 and 79 is cut off. If for any reason the slide valve 31 is maintained in the position in which it cuts off communication between passages 106 and 79 when the brake controlling valve device 2 moves to release position, fluid under pressure in the brake cylinder 8 will be vented to the atmosphere by way of pipe and passage 112, passage 79, passage 110, past unseated valve 108, chamber 105, passage 106, passage and pipe 107 and through the brake controlling valve device 2, thus by-passing the slide valve 31 in the brake cylinder cut off valve portion 20 of the variable load valve device 6.

Having now described my invention, what I claim as new and desire to secure by Letters Patent is:

1. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; a mechanism including means subject to brake pipe pressure and the pressure of fluid in a chamber and other means subject to brake cylinder pressure, said mechanism being responsive to a reduction in brake pipe pressure and an increase in brake cylinder pressure for limiting the supply of fluid under pressure to the brake cylinder to different degrees for a given reduction in brake pipe pressure; and means operative in accordance with the weight of the load carried by the vehicle for conditioning said mechanism for operation to limit the brake cylinder pressure to the particular degree required by the weight of the load carried by the vehicle.

2. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; a mechanism comprising an arrangement including movable abutment means subject to brake pipe pressure and the pressure of fluid in a chamber and other movable abutment means subject to brake cylinder pressure, said mechanism being responsive to a reduction in brake pipe pressure and an increase in brake cylinder pressure for limiting the supply of fluid under pressure to the brake cylinder to different degrees for a given reduction in brake pipe pressure; and means adjustable in accordance with the weight of the load carried by the vehicle for conditioning said mechanism for operation to limit the brake cylinder pressure to the particular degree required by the weight of the load carried by the vehicle.

3. In a variable load fluid pressure brake equipment, the combination with a brake cylinder; an emergency reservoir normally charged with fluid under pressure; a brake pipe normally charged with fluid under pressure to a chosen degree; of a brake controlling valve device operative upon a reduction in brake pipe pressure to supply fluid under pressure to said brake cylinder; a mechanism including means subject to brake pipe pressure and the pressure of fluid in said emergency reservoir and other means subject to brake cylinder pressure, said mechanism being responsive to a reduction in brake pipe pressure and an increase in brake cylinder pressure for limiting the supply of fluid under pressure to the brake cylinder to different degrees for a given reduction in brake pipe pressure; and means including a fulcrum adjustable in accordance with the weight of the load carried by the vehicle for conditioning said mechanism for operation to limit the brake cylinder pressure to the particular degree required by the weight of the load carried by the vehicle.

4. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising a first means subject to the opposing pressures of fluid in the brake pipe and the emergency reservoir and operative by emergency reservoir pressure upon a predetermined reduction in brake pipe pressure and a second means also subject to the opposing pressures of the fluid in the brake pipe and the emergency reservoir and operative by emergency reservoir pressure upon a reduction in brake pipe pressure and a third means operative by brake cylinder pressure; and means including a fluid pressure operated strut mechanism operative in accordance with the weight of the load carried by the vehicle for conditioning said mechanism for operation to limit the brake cylinder pressure to the particular degree required by the weight of the load carried by the vehicle.

5. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising a first movable abutment means subject to the opposing pressures of fluid in the brake pipe and the emergency reservoir and operative by emergency reservoir pressure upon a predetermined reduction in brake pipe pressure and a second movable abutment means also subject to the opposing pressures of fluid in the brake pipe and the emergency reservoir and operative by the emergency reservoir pressure upon a reduction in brake pipe pressure and a third movable abutment means responsive to brake cylinder pressure; an adjustable fulcrum for conditioning said mechanism for operation to vary the attainable limit of brake cylinder pressure; and means operative according to variations in the weight of the load carried by the vehicle for adjusting said fulcrum.

6. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising a cut-off valve portion subject to the opposing pressures of fluid in the brake pipe and the emergency reservoir and operative by emergency reservoir pressure upon a predetermined reduction in brake pipe pressure and a pressure responsive portion also subject to the opposing pressures of the fluid in the brake pipe and the emergency reservoir and operative by the emergency reservoir pressure upon a reduction in brake pipe pressure and a limiting portion responsive to brake cylinder pressure; an adjustable fulcrum for conditioning said mechanism for operation to vary the attainable limit of brake cylinder pressure; and fluid pressure operated means operative according to variations in the weight of the load carried by the vehicle for adjusting said fulcrum.

7. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising a cut-off valve portion responsive to a predetermined reduction in brake pipe pressure to cut off the supply of fluid under pressure from said controlling valve device to the brake cylinder and means subject to the opposing pressures of the fluid in the brake pipe and the emergency reservoir associated with other means subject to brake cylinder pressure operative for limiting the pressure in the brake cylinder; an adjustable fulcrum for conditioning said mechanism for operation to vary the attainable limit of brake cylinder pressure in accordance with the weight of the load carried by the vehicle; fluid pressure operated means operative for adjusting said fulcrum; and valve means responsive to the pressure of fluid in the brake pipe before said chosen pressure is attained for controlling the operation of said fluid pressure operated means.

8. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising valve means operative by emergency reservoir pressure upon a predetermined reduction in brake pipe pressure for cutting off the supply of fluid under pressure from said brake controlling valve device to the brake cylinder and a lever arrangement comprising means subject to the opposing pressures in the brake pipe and the emergency reservoir associated with means subject to brake cylinder pressure and operative to limit the brake cylinder pressure; an adjustable fulcrum for conditioning said mechanism for operation to vary the attainable limit of brake cylinder pressure in accordance with the weight of the load carried by the vehicle; and means comprising a fluid pressure operated strut mechanism for adjusting said fulcrum according to relative vertical movement between a sprung and an unsprung part of the vehicle.

9. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising valve means interposed between the brake controlling valve device and the brake cylinder operative upon a predetermined reduction in brake pipe pressure to cut off the flow of fluid under pressure from the brake controlling valve device to the brake cylinder and lever means including movable abutment means subject to the opposing pressures of the brake pipe and emergency reservoir associated with movable abutment means subject to brake cylinder pressure for limiting the brake cylinder pressure; an adjustable fulcrum for conditioning said mechanism for operation to vary the attainable limit of brake cylinder pressure in accordance with the load carried by the vehicle; and means for positioning said fulcrum when the pressure in the brake pipe is less than a predetermined degree below said chosen degree and for maintaining said fulcrum in its adjusted position when the pressure in the brake pipe is above said predetermined degree.

10. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; a mechanism for limiting the supply of fluid under pressure to the brake cylinder to different degrees for a given reduction in brake pipe pressure; said mechanism comprising valve means interposed between the brake controlling valve device and the brake cylinder operative upon a predetermined reduction in brake pipe pressure to cut off the flow of fluid under pressure from the brake controlling valve device to the brake cylinder and lever means including movable abutment means subject to the opposing pressures of the brake pipe and emergency reservoir associated with movable abutment means subject to brake cylinder pressure for limiting the brake cylinder pressure; an adjustable fulcrum for conditioning said mechanism for operation to vary the attainable limit of brake cylinder pressure in accordance with the weight of the load carried by the vehicle; an adjustable fulcrum for conditioning said mechanism for operation to vary the attainable limit of brake cylinder pressure in accordance with the load carried by the vehicle; a strut mechanism for adjusting said fulcrum; and valve means subject to brake pipe pressure for operating said strut mechanism.

11. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; means operative for limiting the supply of fluid under pressure to the brake cylinder to different degrees for a given reduction in brake pipe pressure; said means including a lever mechanism comprising movable abutment means subject to brake pipe pressure and a spring and the opposing pressure of fluid in a chamber and operative by the pressure of fluid in the chamber upon a reduction in brake pipe pressure and a lever arrangement adapted to be controlled in accordance with an increase in brake cylinder pressure; and adjusting means operative in accordance with the weight of the load carried by the vehicle for conditioning said means, said adjusting means being constructed and arranged to condition said lever mechanism and said lever arrangement for operation to limit the brake cylinder pressure to the particular degree required by the weight of the load carried by the vehicle.

12. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; a reservoir adapted to be charged with fluid at substantially the same pressure as the fluid in the brake pipe; means operative for limiting the supply of fluid under pressure to the brake cylinder to different degrees for a given reduction in brake pipe pressure, said means including a lever mechanism comprising a movable abutment subject to the opposing pressure of the fluid in said reservoir and the fluid in the brake pipe and a spring and operative by the pressure of fluid in said reservoir upon a reduction in brake pipe pressure and a lever arrangement adapted to be controlled in accordance with an increase in brake cylinder pressure, an adjustable fulcrum constructed and arranged to cooperate with both said lever mechanism and said lever arrangement to vary the attainable limit of brake cylinder pressure; and means operative according to variations in the weight of the load carried by the vehicle for adjusting said fulcrum.

13. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; a first lever mechanism; a first arrangement of movable abutments subject to the pressure of fluid in the brake pipe and of a spring and the opposing pressure of fluid in a chamber for operating said first lever mechanism; a second lever mechanism; a second movable abutment arrangement subject to brake cylinder pressure for operating said second lever mechanism; a fulcrum cooperating with said first and said second lever mechanism upon a decrease in brake pipe pressure and an increase in brake cylinder pressure to limit of brake cylinder pressure; said fulcrum being adjustable relative to both lever mechanisms to limit the brake cylinder pressure to a different degree and means operative according to variations in the weight of the load carried by the vehicle for adjusting said fulcrum.

14. In a variable load fluid pressure brake equipment, the combination with a brake cylinder; a brake pipe normally charged with fluid under pressure to a chosen degree; of a brake controlling valve device operative upon a reduction in brake pipe pressure to supply fluid under pressure to said brake cylinder; means operative for limiting the supply of fluid under pressure to the brake cylinder to different degrees for a given reduction in brake pipe pressure, said means including a normally seated valve, a lever mechanism controlled by brake cylinder pressure operative to unseat said valve to effect a reduction in the pressure of fluid in said brake cylinder, spring means for opposing operation of said lever mechanism to unseat said valve until a predetermined brake cylinder pressure has been established; a fulcrum adjustable for varying the leverage of said lever mechanism; and means operative according to variations in the weight of the load carried by the vehicle for adjusting said fulcrum.

15. In a variable load fluid pressure brake equipment, the combination with a brake cylinder; a brake pipe normally charged with fluid under pressure to a chosen degree; an emergency reservoir charged with fluid under pressure; of a brake controlling valve device operative upon a reduction in brake pipe pressure to supply fluid under pressure to said brake cylinder; means operative for limiting the supply of fluid under pressure to the brake cylinder and thereby the brake cylinder pressure to different degrees for a given reduction in brake pipe pressure, said means including a normally seated valve, a lever mechanism controlled by brake cylinder pressure operative to unseat said valve to effect a reduction in the pressure of fluid in said brake cylinder, means subject to brake pipe pressure and a spring and the opposing pressure of fluid in the emergency reservoir and responsive to a reduction in brake pipe pressure for opposing operation of said lever mechanism to unseat said valve, a fulcrum adjustable for varying the leverage of said lever mechanism; and means operative according to variations in the weight of the load carried by the vehicle for adjusting said fulcrum.

16. In a variable load fluid pressure brake equipment, the combination with a brake cylinder; a brake pipe normally charged with fluid under pressure to a chosen degree; an emergency reservoir normally charged with fluid under pressure; of a brake controlling valve device operative upon a reduction in brake pipe pressure to supply fluid under pressure to said brake cylinder; means operative for limiting the supply of fluid under pressure to the brake cylinder and thereby the brake cylinder pressure to different degrees for a given reduction in brake pipe pressure, said means including a normally seated valve, a lever mechanism controlled by brake cylinder pressure operative to unseat said valve to effect a reduction in pressure of fluid in said brake cylinder, a lever arm and a movable abutment subject to brake pipe pressure and a spring and the opposing pressure of fluid in said emergency reservoir and responsive to a reduction in brake pipe pressure for actuating said lever arm for opposing operation of said lever mechanism to unseat said valve, a fulcrum adjustable for varying the leverage of said lever mechanism; and means operative according to variations in the weight of the load carried by the vehicle for adjusting said fulcrum.

17. In a variable load fluid pressure brake equipment, the combination with a brake cylinder; a brake pipe normally charged with fluid under pressure to a chosen degree; an auxiliary reservoir; an emergency reservoir; a brake controlling valve device having a release position for charging said auxiliary and said emergency reservoirs with fluid under pressure and having an application position for supplying fluid under pressure from both said auxiliary and emergency reservoirs to said brake cylinder; of means operative for limiting the supply of fluid under pressure to the brake cylinder to different degrees for a given reduction in brake pipe pressure, said means including a normally seated valve, a first movable abutment subject to brake cylinder pressure operative in response to an increase in brake cylinder pressure for unseating said valve to effect a reduction in the pressure of fluid in the brake cylinder, a second movable abutment subject to the pressure of fluid under pressure in the brake pipe and a spring and the opposing emergency reservoir pressure and being operative in response to a reduction in brake pipe pressure for yieldably opposing operation of said first movable abutment to unseat said valve, and a variable leverage means associated with said first and said second movable abutments; and means operative according to variations in the weight of the load carried by the vehicle for adjusting the leverage of said variable leverage means.

18. In a variable load brake apparatus for a vehicle, in combination, a load regulated mechanism operative to control the braking power according to the load on the vehicle, said load regulated mechanism comprising a movable fulcrum; means for adjusting the position of said fulcrum according to the load on the vehicle, said means comprising a member for transmitting motion to said movable fulcrum, a strut adapted to be moved into and out of engagement with a stop on a fixed part of the vehicle, a stem operatively connected to said strut, means normally locking said member to said stem, a movable abutment for actuating said stem and thereby said member and said strut, said movable abutment being responsive to pressure of fluid supplied thereto for actuating said stem said member and said strut as a unit until said strut engages said stop and upon continued movement for actuating said stem relative to said strut and for automatically effecting operation of said locking means to unlock said member from said stem, means operative when said member is unlocked from said stem for positioning said member, spring means operative upon a decrease in the pressure of fluid acting on said abutment for actuating said stem relative to said strut and for automatically effecting operation of said locking means to lock said member to said stem and upon continued movement for actuating said stem, said member and said strut as a unit thereby moving said strut out of engagement with said stop; and fluid pressure operated means for controlling the supply of fluid under pressure to and the release of fluid under pressure from said abutment.

19. In a variable load brake apparatus for a vehicle, in combination, a load regulated mechanism operative to control the braking power according to the load on the vehicle, said load regulated mechanism comprising a movable fulcrum; means for adjusting the position of said fulcrum according to the load on the vehicle, said means comprising a strut adapted to engage a stop provided on a fixed part of the vehicle, a stem operatively connected to said strut, a member slidably mounted on said stem and said strut and having a mechanical connection with said movable fulcrum, locking means normally maintaining said member locked to said stem, a piston responsive to an increase in the pressure of fluid for first actuating said stem said strut and said member as a unit until said strut engages said stop, and for then actuating said stem relative to said stop and for at the same time causing said strut to effect operation of said locking means to unlock said member from said stem and, spring means operative to effect movement of said member relative to said stem and said strut upon continued movement of said stem relative to said strut, said piston being responsive to a decrease in the pressure of fluid for first actuating said stem relative to said strut and said member and to thereby permit said locking means to lock said member to said stem and for then actuating said stem and said member and thereby said movable fulcrums and to finally move said stem said member and said strut as a unit thereby moving said strut out of engagement with said stop; and means controlled in accordance with the pressure of fluid in the apparatus for controlling the supply of fluid under pressure to and the release of fluid under pressure from said piston.

20. In a variable load brake apparatus for a vehicle in combination, a load regulated mechanism operative to control the braking power according to the load on the vehicle, said load regulated mechanism comprising a movable fulcrum; means for adjusting the position of said fulcrum according to the load on the vehicle, said means comprising a strut mechanism having a strut adapted to engage a stop on a fixed part of the vehicle, a stem operatively connected to said strut, a member slidably mounted on said stem and said strut, an arm carried by said member and engaging said movable fulcrum, means for locking said member to said stem to provide for movement of said member with said stem, a piston operative upon the supply of fluid under pressue thereto to effect movement of said stem said strut and said member as a unit, spring means interposed between and operatively engaging said strut and said stem to provide for relative movement between said stem and said strut when said strut engages said stop and to permit said strut to effect operation of said locking means to unlock said member from said stem, spring means adapted to effect movement of said member relative to said stem and said strut upon continued movement of said stem relative to said strut, other spring means operative upon the release of fluid under pressure from said piston for first effecting movement of said stem relative to said strut and said member and upon continued movement of said piston to cause said locking means to lock said member to said stem and then move said member with said stem and finally move said stem and said member and said strut as a unit thereby moving said strut out of engagement with said stop; and means controlled by fluid under pressure for controlling the supply of fluid under pressure to and the release from said piston.

ROBERT M. OLIVER.